United States Patent
Fritz et al.

(10) Patent No.: US 8,111,490 B2
(45) Date of Patent: Feb. 7, 2012

(54) METHOD AND DEVICE FOR PROTECTION OF A SWITCHING DEVICE CONTROLLED BY A CONTROL UNIT

(75) Inventors: Gerald Fritz, Neunkirchen (AT); Gerhard Fuchs, St. Andrä-Wördern (AT); Gebhard Hopfmueller, Leobersdorf (AT)

(73) Assignee: Continental Automotive GmbH, Hannover (DE)

( * ) Notice: Subject to any disclaimer, the term of this patent is extended or adjusted under 35 U.S.C. 154(b) by 1007 days.

(21) Appl. No.: 11/085,691

(22) Filed: Mar. 21, 2005

(65) Prior Publication Data
US 2005/0231865 A1    Oct. 20, 2005

(30) Foreign Application Priority Data
Mar. 22, 2004  (DE) .................. 10 2004 013 925

(51) Int. Cl.
| H02H 9/00 | (2006.01) |
| H02H 3/20 | (2006.01) |
| H02P 1/00 | (2006.01) |
| H02P 3/00 | (2006.01) |
| H02P 3/20 | (2006.01) |
| H02P 5/00 | (2006.01) |
| H02P 7/00 | (2006.01) |

(52) U.S. Cl. .......... 361/56; 361/91.1; 318/280; 318/284
(58) Field of Classification Search ................ 361/56
See application file for complete search history.

(56) References Cited

U.S. PATENT DOCUMENTS

| 4,206,443 | A | * | 6/1980 | Britton ............. 340/3.43 |
| 4,703,388 | A | * | 10/1987 | Ruhnau ............ 361/91.6 |
| 6,411,481 | B1 | * | 6/2002 | Seubert ............ 361/91.1 |
| 2002/0117982 | A1 | * | 8/2002 | Jehn ................ 318/280 |
| 2002/0149261 | A1 | | 10/2002 | Vierling et al. ....... 307/9.1 |

* cited by examiner

*Primary Examiner* — Jared Fureman
*Assistant Examiner* — Lucy Thomas
(74) *Attorney, Agent, or Firm* — King & Spalding LLP

(57) ABSTRACT

Method for protection of a switching device controlled by a control unit, through which an electric drive can be disengaged during the period of an overvoltage surge caused by a load dump in the electrical system of a vehicle, in which the drive current rises to a maximum value in a first slot within the duration of the overvoltage surge and drops in the second slot connected to the first time slot, with the following process steps: recognition of a load dump by recording a limit voltage value in the electrical system by the control unit, disengagement of the electric drive in the event of a load dump at a switching time stipulated by the control unit, which lies after the first time slot.

18 Claims, 2 Drawing Sheets

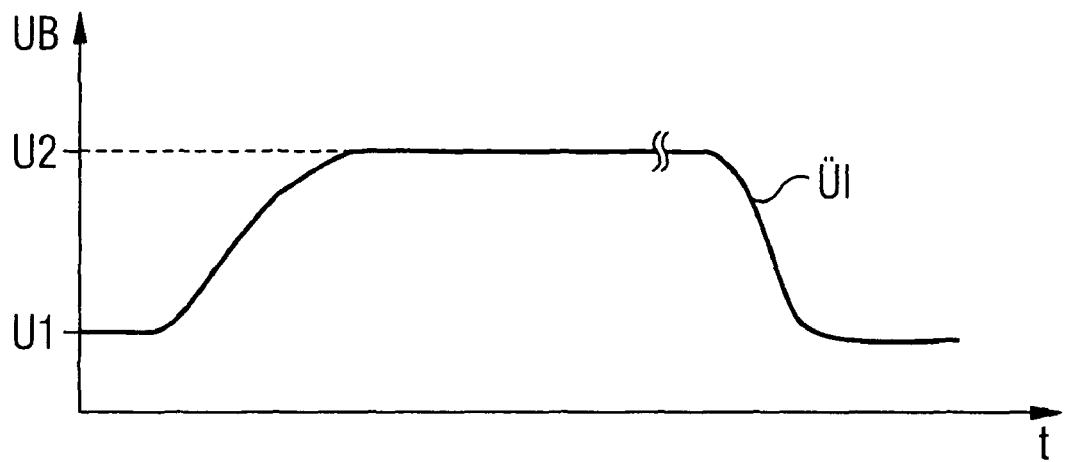
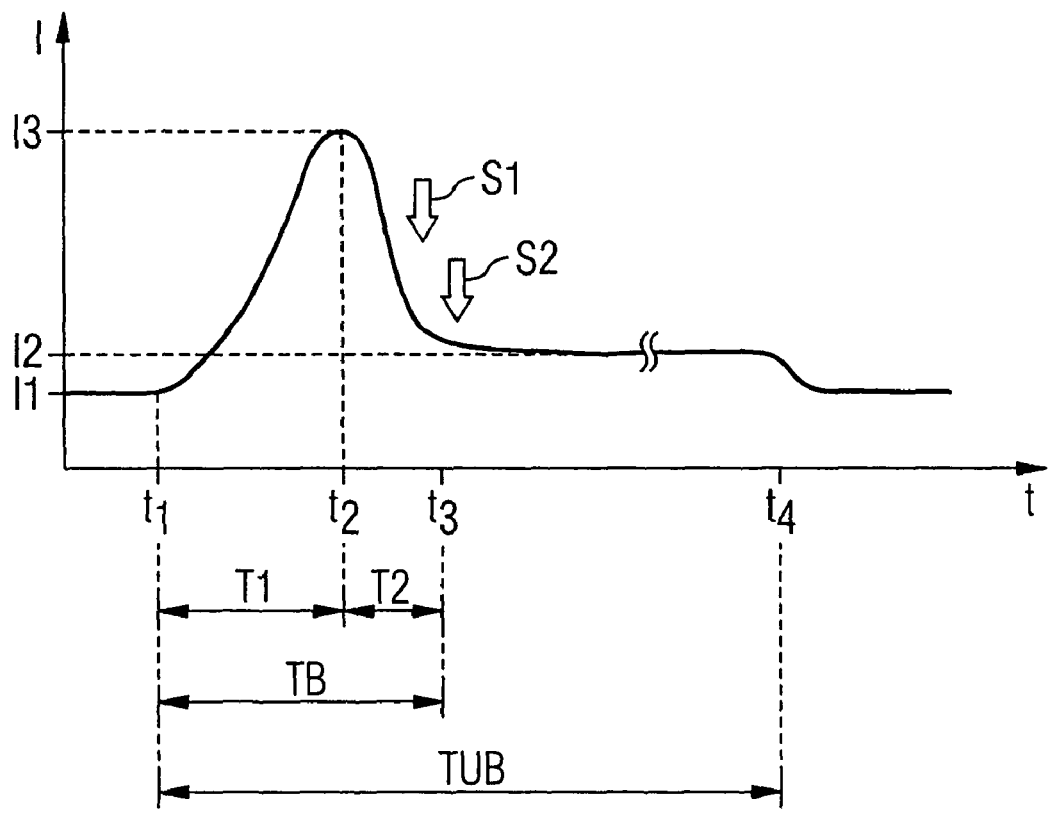

METHOD AND DEVICE FOR PROTECTION OF A SWITCHING DEVICE CONTROLLED BY A CONTROL UNIT

PRIORITY

This application claims priority to German Application Number DE 10 2004 013 925.3 filed Mar. 22, 2004.

TECHNICAL FIELD

The invention concerns a method and device for protection of a switching device controlled by a control unit, through which an electrical drive, during an overvoltage surge in the electrical system of a vehicle caused by a load dump, can be switched off, in which case the drive current rises during the overvoltage surge in a first time slot to a maximum value and drops in a second time slot connected to the first time slot.

BACKGROUND

Under special operating conditions voltage surges of limited duration can occur in the electrical system of a vehicle. Causes of these voltage surges can include a so-called load dump, that is, an interruption of the connection between the generator and vehicle battery during the ignition process. The generator reacts to the sudden drop in load with a voltage increase, whose magnitude and trend is essentially dependent on the speed of the generator and the type of interruption. A pulse-like voltage surge is characteristic of a load dump. Causes include incomplete fastening or oxidation of the battery terminal and can be caused by a line break.

Battery discharge is critical for the electronic components connected to an electrical system of a vehicle, since formation of voltage transients with peak values up to 100 V can occur. However, in addition to protection of electronic components, the load dump can also be critical with respect to safety. A power window in operation or a sliding roof drive under each operating state must be capable of being switched off, so that the hazard of injury by jamming is ruled out as much as possible. Known devices for remote-operated power windows and sliding roof drives are therefore geared toward immediately switching off the motor after recognition of a load dump. Disengagement generally occurs through a relay. Immediately after the voltage surge, however, the motor accelerates and accepts increased current. If the switching process occurs in the initial phase of the voltage surge, during the disengagement process, because of the voltage increase and the increased motor current, an arc can occur over the opening contacts of the relay. In a simple design of the relay, it can even happen that the relay contacts melt and the switching device fails. The jamming protection required by safety engineering for the remote-operated actuator is then no longer guaranteed.

In order to protect assemblies in a vehicle electrical system from overvoltages, special components, like varistors, are known. However, their use requires not only additional space, but is often ruled out in automotive technology for cost reasons.

In order to protect electronic components in an electrical system of a vehicle from transient overvoltages without additional protective devices, a specially designed control unit is proposed in US 2002/0149261 A1. The control unit continuously monitors the electrical system for overvoltages. If the system voltage surpasses a stipulated limit value, loads, like glow plugs, seat heating or the heating device of the rear window, are connected to the electrical system. The overvoltage surge caused by a load dump is counteracted by this centrally controlled artificial loading of the electrical system. This protective measure, however, presumes that additional loads are present and can still be engaged on occurrence of the overvoltage.

SUMMARY

The task of the invention is to offer a method and device for protection of a switching device in a vehicle that can be implemented at very low cost and is independent of a central, specially designed control unit.

It is proposed according to the invention to disengage an electric drive not immediately after recognition of an overvoltage surge, but to delay disengagement until the transient process is over and the motor speed has essentially adjusted to the overvoltage. If disengagement does not occur in the first time slot, in which the motor takes on an increasingly larger current, but is delayed until the drive current is diminishing or has diminished, the requirements on the switching elements of the switching device are reduced. The optimal switching time can be determined during drive design, depending on the safety requirements and the type of drive. The determined value can be stored in a control unit and, during a load dump, the switching device for the drive being disengaged can be stipulated. In a power window, the value of this disengagement current lies about 20% above the value of the motor current in the transient state.

If the switching device is an electromagnetic relay, the formation of an arc between the separating contacts can be largely avoided by the delayed disengagement according to the invention. Because of this, it is possible to use more cost-effective relays. The hazard of safety-critical melting of the relay contacts is largely ruled out. The method according to the invention can therefore be characterized by the following process steps:

A) Recognition of a load dump by recording a limit voltage in the electrical system by the control unit;
B) Disengagement of the electrical drive in the event of a load dump within the duration of the overvoltage surge at a switching time that lies after the first time slot and is stipulated by the control unit.

According to the invention, the switching time stipulated by the control unit is chosen so that, on the one hand, the switching elements are not overloaded, but, on the other hand, in safety-critical applications, disengagement is still sufficiently fast. Implementation of the invention requires no additional components, but is implemented cost-effectively by appropriate layout of the software of the control unit. The invention can also be implemented in existing hardware at low cost.

A switching time within a time slot, in which the drive current drops, that is, in which the drive is concluding or has concluded the acceleration phase, is preferred. Because of this, on the one hand, the disengagement current is reduced, and, on the other hand, disengagement is still fast enough in safety-critical applications.

In a few safety-critical cases, it can also be advantageous if disengagement is further delayed and only occurs after the second time slot, but within the duration of the overvoltage surge. In this time slot, the drive has concluded the acceleration phase caused by the overvoltage and the drive current serves exclusively to overcome the load moment. Owing to the low switching current, a particularly cost-effective relay can be used.

If the drive is arranged in the diagonal branch of a bridge circuit and the switching device consists of a double-switching relay, it is favorable if the disengagement process occurs actively by exciting a relay coil connected to a moving contact part. In comparison with disengagement of a relay coil, in which the opening process of the relay contacts is exclusively stipulated by the mechanical contact spring, the electro-dynamic switching process is faster and the load on the relay contacts is therefore lower.

BRIEF DESCRIPTION OF THE DRAWINGS

The invention is explained below by means of a practical example with reference to the accompanying figures:

FIG. 2 shows the time trend of the system voltage of a vehicle during a load dump; and FIG. 3 shows the time trend of the disengagement current in an electric drive in operation during a load dump.

DETAILED DESCRIPTION

Figure 1:
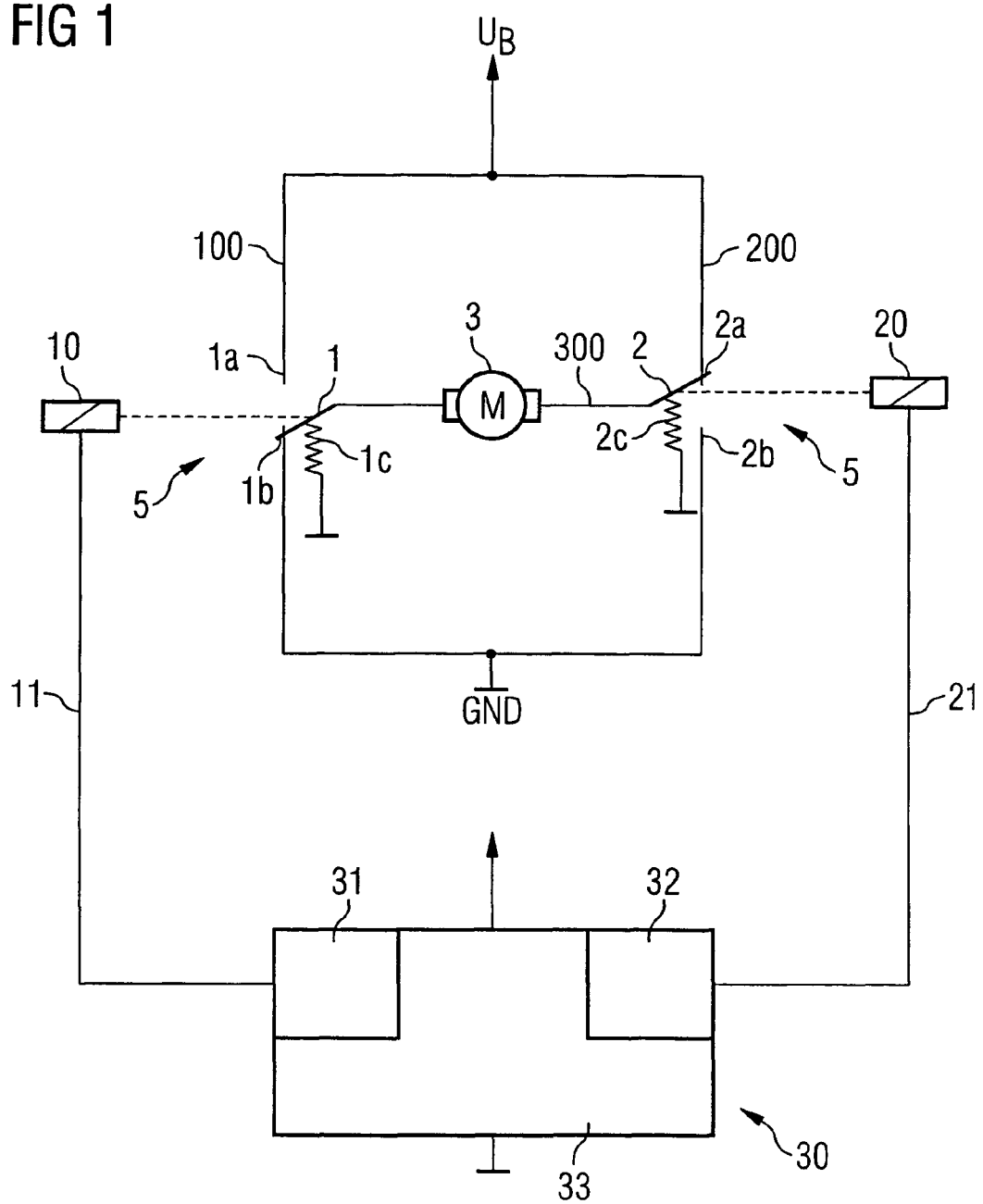
FIG. 1 shows a motor in a bridge circuit, in which the switching device is formed by a double-switching relay and controlled by a control unit.

FIG. 1 shows a practical example of the invention, as used, for example, for a drive device in a power window in a vehicle. Reference number 3 denotes a DC motor arranged in a diagonal branch 300 of a bridge circuit of a switching device 5. The bridge circuit is supplied by the electrical system of a vehicle, which is marked UB and GND in FIG. 1. The motor 3 is operated in two directions of rotation. Reversal of the direction of rotation occurs by a contact arrangement of a switching relay 5. A moving contact parts 1 and 2 can each be switched between fixed countercontacts 1a, 1b or 2a, 2b that are arranged in the two bridge branches 100, 200. Depending on the position of these moving contact parts 1 and 2, the drive current in FIG. 1 flows in the diagonal branch 300 from right to left or from left to right, when both contact parts 1 and 2 are switched accordingly. The motor 3 is off, when the two contact parts 1, 2 are switched either to ground potential GND or the battery potential UB. Switching of the contact parts 1, 2 occurs through connected relay coils 10 and 20, whose armatures are mechanically connected to a moving contact part 1 or 2. The relay coils 10, 20 are connected to signal outputs 31, 32 of the control unit 30 via connection lines 11, 21. Control units, with the function of a microcomputer and with signal outputs for direct control of a relay, are available in an integrated design for use in vehicles. By corresponding excitation of the relay coils, the current direction through control 30 can be reversed in diagonal branch 300 and the motor can be reversed. Monitoring of the operating voltage of the electrical system (not further shown in FIG. 1) occurs via the control unit 30, which scans the system voltage UB, for example, via a microcontroller 33, at specific time intervals. If the microcontroller 33, for example, recognizes an overvoltage, i.e., the magnitude and duration of the overvoltage surpass a stipulated limit value, it takes a switching measure, explained further below, in which it acts on the relay coils 10 and 20 via the relay control 31 and 32 via connection lines 11 and 21. Ordinarily, double-switching relays are used in power windows, the moving contact elements 1, 2 of which are kept at ground potential in the unexcited state of coils 10, 12 by contact springs. During actuation, one of the contact elements 1, 2 is switched to battery potential. Disengagement can occur, so that excitation of the contact 2 switched to UB is interrupted and contact 2 drops out, because of the spring force of contact spring 2c. Disengagement, however, can also occur electro-dynamically. The latter is preferred. For example, if, with the contact configuration depicted in FIG. 1, a load dump occurs during actuation, the moving contact part depicted on the left is preferably switched against the force of mechanical spring 1c, according to the invention, electro-dynamically by means of relay coil 10 to counter-contact 1a. In comparison with the switching process that is executed by disengagement of excitation of relay coil 20, and whose switching speed is exclusively produced by the force of mechanical spring 2c, the preferred electro-dynamic switching of contact 1 is faster. The formation of an arc is counteracted on this account.

The time trend of an overvoltage surge UI, caused by a load dump, is sketched in FIG. 2. The depiction in FIG. 2 shows the corresponding drive current I in the diagonal branch of the bridge circuit according to FIG. 1 as a function of time t. The overvoltage surge occurs during an actuation process. The depiction in FIG. 3 is typical for the current trend of a power window drive. The sudden load drop, caused by the load dump, which occurs at time t 1, means that the generator responds to this unloading with a voltage increase in the electrical system. The system voltage UB in the depiction of FIG. 2 rises from an initial value U1 (for example 12V) to an overvoltage value U2 (up to 100 V). During the duration TUB of the voltage increase, an increased operating voltage U2 is present on the motor. In an initial phase, this means that the motor accelerates the actuation process, for example, closure of a vehicle window. For acceleration of the inertial moment in the drivetrain, the motor takes up an increasingly higher current in a first time slot T1. The motor current I rises in the interval t1 to t2 from an initial value I1 to a maximum value I3. In a second time slot T2 connected to the first time slot T1, the motor current I drops. On completion of the acceleration phase TB, a stationary motor current I 2 is set, which corresponds to the higher voltage U2 relative to U1. In an electrically operated window, the motor current in the first time slot of about 40 milliseconds can rise from about 8 A to 60 A and after conclusion of the acceleration phase, drop back to 12 A. According to the invention, the switching process in a power window is preferably carried out at about I2+20% (S2 in FIG. 3). In order to rule out the hazard of injury by jamming, thus far in power windows the drive has been separated from the electrical system, generally in a time slot between 20 and 50 milliseconds after recognition of the overvoltage. In order to be able to reliable handle these comparatively high switching currents, correspondingly costly relays have thus far been required.

According to the invention, the switching process now does not occur immediately after recognition of the overvoltage, but is delayed in time relative to it, i.e., for example, about 100 milliseconds later. The switching time, as presented above, is stipulated by the control unit. The switching relay is controlled according to the invention at a time, in which the acceleration process of the motor 3 has largely ended. The switching time is specific for the corresponding drive system and is determined experimentally. The determined switching point is stored in microcontroller 33 and is used in connection with the switching device 5 during a load dump. These switching times are marked S 1 and S 2 as examples in FIG. 3.

What we claim is:

1. A method for protection of a switching device controlled by a control unit through which an electric drive can be disengaged during a period of an overvoltage surge caused by a load dump in an electrical system of a vehicle, said method comprising:

controlling at least one relay to engage a drive, wherein the relay directly connects the drive with ground and a supply voltage of the electrical system;

monitoring the electrical system for occurrence of a load dump during engagement of said drive by detecting an overvoltage of a supply voltage in the electrical system by the control unit, wherein due to the overvoltage a current through the drive rises in a first time slot to a maximum value and drops in a second time slot connected to the first time slot to a second value, and controlling the relay to disconnect the drive from the electrical system in the case of a load dump at a time stipulated by the control unit after the first time slot.

2. A method according to claim 1, wherein the disengaging step is carried out in the second time slot.

3. A method according to claim 1, wherein the disengaging step is carried out after the second time slot and within duration of the overvoltage surge.

4. A method according to claim 1, wherein the switching device has a switching relay and the disengaging step is carried out by excitation of a relay coil.

5. A method according to claim 1, wherein the switching time is selected at a time when said drive current drops to about 20% above an average current during said overvoltage surge.

6. A device for protection of a switching device controlled by a control unit, wherein an electric drive is coupled through said switching device with an electrical system of a vehicle and during operation of the electrical drive an overvoltage surge may occur in said electrical system, wherein said switching device comprises at least one relay which is operable to directly connect the electric drive with ground and a supply voltage of the electrical system;

and wherein said device is operable to control the relay to disconnect said electric drive from the electrical system during an overvoltage surge caused by a load dump in the electrical system, in which a drive current during the overvoltage surge in a first time slot rises to a maximum value and drops in a second time slot connected to the first time slot, wherein the control unit is configured such that a switching time is chosen by the control unit, said switching time being after the first time slot.

7. A device according to claim 6, wherein the switching time lies in the second time slot.

8. A device according to claim 6, wherein the switching time lies after an end of the second time slot and before an end of the overvoltage surge.

9. A device according to claim 6, wherein the control unit has a microcontroller and includes a memory, said memory stores a value of the switching time.

10. A device according to claim 6, wherein the electric drive is arranged in a diagonal branch of a bridge circuit said bridge circuit being directly connected to a supply voltage and ground of said electrical system, the switching device is formed by a double-switching relay with two moving contact elements, the drive current is guided via the contact elements, and one of the contact elements is kept in a rest position on a counter-contact via contact spring, and the switching process is produced by electrodynamic opening of the one contact element against the spring force of contact spring.

11. A device according to claim 10, wherein the contact elements are enclosed by a common housing.

12. A device according to claim 6, wherein the electric drive is part of a remote-controlled power window.

13. A device according to claim 12, wherein the switching time lies in a time interval between 100 milliseconds and 400 milliseconds after the beginning of the overvoltage surge.

14. A device according to claim 6, wherein the switching time is selected at a time when said drive current drops to about 20% above an average current during said overvoltage surge.

15. A method for protection of a switching device controlled by a control unit through which an electric drive can be disengaged, said method comprising:

engaging the electrical drive by connecting the electrical drive directly by means of at least one relay with a supply voltage and ground;

monitoring an electrical system for occurrence of an interruption of the connection between a generator and a vehicle battery during engagement of said drive by detecting an overvoltage of a supply voltage in the electrical system by the control unit, wherein the drive current within the period of the overvoltage rises in a first time slot to a maximum value and drops in a second time slot connected to the first time slot, and disengaging the drive by means of said at least one relay in the case of said interruption at a time stipulated by the control unit after the first time slot.

16. The method according to claim 1, wherein the switching device comprises a first relay having a first switching contact that directly connects ground or the supply voltage with a first terminal of the electric drive and a second relay having a second switching contact that directly connects ground or the supply voltage with a second terminal of the electric drive.

17. The device according to claim 6, wherein the switching device comprises a first relay having a first switching contact that directly connects ground or the supply voltage with a first terminal of the electric drive and a second relay having a second switching contact that directly connects ground or the supply voltage with a second terminal of the electric drive.

18. The method according to claim 15, wherein the switching device comprises a first relay having a first switching contact that directly connects ground or the supply voltage with a first terminal of the electric drive and a second relay having a second switching contact that directly connects ground or the supply voltage with a second terminal of the electric drive.

* * * * *